United States Patent
Gong et al.

(10) Patent No.: US 10,095,866 B2
(45) Date of Patent: Oct. 9, 2018

(54) SYSTEM AND METHOD FOR THREAT RISK SCORING OF SECURITY THREATS

(71) Applicant: Cyphort, Inc., Santa Clara, CA (US)

(72) Inventors: Fengmin Gong, Livermore, CA (US);
Frank Jas, Scotts Valley, CA (US);
Druce MacFarlane, Aptos, CA (US)

(73) Assignee: Cyphort Inc., Santa Clara, CA (US)

( * ) Notice: Subject to any disclaimer, the term of this patent is extended or adjusted under 35 U.S.C. 154(b) by 49 days.

(21) Appl. No.: 14/936,593

(22) Filed: Nov. 9, 2015

(65) Prior Publication Data

US 2016/0078229 A1   Mar. 17, 2016

Related U.S. Application Data (63) Continuation-in-part of application No. 14/629,444, filed on Feb. 23, 2015, now Pat. No. 9,686,293.

(60) Provisional application No. 61/944,006, filed on Feb. 24, 2014.

(51) Int. Cl.

| H04L 29/06 | (2006.01) |
|---|---|
| G06F 21/56 | (2013.01) |
| G06F 21/57 | (2013.01) |
| H04L 12/26 | (2006.01) |
| H04L 12/24 | (2006.01) |

(52) U.S. Cl.
CPC .......... *G06F 21/561* (2013.01); *G06F 21/564* (2013.01); *G06F 21/577* (2013.01); *H04L 63/145* (2013.01); *H04L 63/1416* (2013.01); *H04L 41/06* (2013.01); *H04L 43/04* (2013.01); *H04L 43/06* (2013.01); *H04L 43/18* (2013.01)

(58) Field of Classification Search
None
See application file for complete search history.

(56) References Cited

U.S. PATENT DOCUMENTS

| 7,418,729 B2 | 8/2008 | Szor |
|---|---|---|
| 7,540,030 B1 | 5/2009 | Zaitsev |
| 7,664,626 B1 | 2/2010 | Ferrie |
| 7,725,937 B1 | 5/2010 | Levy |
| 8,060,074 B2 | 11/2011 | Danford et al. |
| 8,108,912 B2 | 1/2012 | Ferris |
| 8,151,352 B1 | 4/2012 | Novitchi |

(Continued)

OTHER PUBLICATIONS

Bhatt et al.; Analyzing Targeted Attacks using Hadoop applied to Forensic Investigation; 2013; Retrieved from the Internet <URL: http://icofcs.org/2013/ICoFCS-2013-004.pdf>; pp. 1-6, as printed.*

(Continued)

*Primary Examiner* — Saleh Najjar
*Assistant Examiner* — Michael W Chao
(74) *Attorney, Agent, or Firm* — Harrity & Harrity, LLP (57) ABSTRACT

A system configured to generate a risk score for a threat activity including a digital device. The digital device configured to extract one or more threat events on a network based on metadata for one or more targeted digital devices on the network. Further, the digital device is configured to detect one or more incidents based on a correlation between at least a first threat event of the one or more threat events and a second threat event of the one or more threat events. And, the digital device is configured to generate a risk score for each of said one or more incidents.

20 Claims, 4 Drawing Sheets

(56) References Cited

U.S. PATENT DOCUMENTS

| | | |
|---|---|---|
| 8,176,477 B2 | 5/2012 | Wu |
| 8,204,984 B1 | 6/2012 | Aziz et al. |
| 8,266,698 B1 | 9/2012 | Seshardi et al. |
| 8,375,444 B2 | 2/2013 | Aziz et al. |
| 8,375,450 B1 | 2/2013 | Oliver et al. |
| 8,407,797 B1 | 3/2013 | Novitchi |
| 8,516,589 B2 | 8/2013 | Jeong et al. |
| 8,555,388 B1 | 10/2013 | Wang et al. |
| 8,745,734 B1 | 6/2014 | Brandwhie et al. |
| 8,751,490 B1 | 6/2014 | Cooley |
| 8,769,683 B1 | 7/2014 | Oliver |
| 8,862,739 B2 | 10/2014 | Brownlow et al. |
| 8,881,289 B2 * | 11/2014 | Basavapatna ......... G06F 21/552 726/25 |
| 8,984,581 B2 | 3/2015 | Luna et al. |
| 9,185,095 B1 * | 11/2015 | Moritz ................. H04L 63/102 |
| 9,519,781 B2 | 12/2016 | Golshan et al. |
| 9,609,011 B2 * | 3/2017 | Muddu ............... H04L 63/1425 |
| 9,667,641 B2 * | 5/2017 | Muddu ............... H04L 63/1425 |
| 9,686,293 B2 | 6/2017 | Golshan et al. |
| 9,699,205 B2 * | 7/2017 | Muddu ............... H04L 63/1425 |
| 2005/0081053 A1 | 4/2005 | Aston et al. |
| 2006/0010440 A1 | 1/2006 | Anderson et al. |
| 2006/0161982 A1 | 7/2006 | Chari et al. |
| 2007/0244987 A1 | 10/2007 | Pedersen et al. |
| 2007/0250930 A1 | 10/2007 | Aziz et al. |
| 2008/0016570 A1 | 1/2008 | Capalik |
| 2008/0086776 A1 | 4/2008 | Tuvell et al. |
| 2008/0216175 A1 | 9/2008 | Pike |
| 2009/0077544 A1 | 3/2009 | Wu |
| 2010/0064299 A1 | 3/2010 | Kacin et al. |
| 2010/0077481 A1 | 3/2010 | Polyakov et al. |
| 2010/0115621 A1 | 5/2010 | Staniford et al. |
| 2010/0192223 A1 | 7/2010 | Ismael et al. |
| 2011/0041179 A1 | 2/2011 | Stahlberg |
| 2011/0054879 A1 | 3/2011 | Bogsanyl et al. |
| 2011/0055123 A1 | 3/2011 | Kennedy |
| 2011/0138471 A1 * | 6/2011 | Van De Weyer ..... G06F 21/554 726/25 |
| 2011/0145926 A1 | 6/2011 | Dalcher et al. |
| 2011/0167494 A1 | 7/2011 | Bowen et al. |
| 2011/0225655 A1 | 9/2011 | Niemela et al. |
| 2011/0247072 A1 | 10/2011 | Stanford et al. |
| 2011/0271343 A1 | 11/2011 | Kim et al. |
| 2011/0302656 A1 | 12/2011 | El-Moussa |
| 2012/0011590 A1 * | 1/2012 | Donovan ............ H04L 63/1408 726/25 |
| 2012/0110672 A1 | 5/2012 | Judge et al. |
| 2012/0272317 A1 | 10/2012 | Rubin et al. |
| 2012/0311562 A1 * | 12/2012 | Wang ...................... H04L 67/34 717/177 |
| 2013/0097701 A1 * | 4/2013 | Moyle .................. G06F 21/552 726/22 |
| 2013/0097706 A1 | 4/2013 | Titonis et al. |
| 2013/0117848 A1 | 5/2013 | Golshan et al. |
| 2013/0117849 A1 | 5/2013 | Golshan et al. |
| 2013/0227691 A1 | 8/2013 | Aziz et al. |
| 2013/0263260 A1 | 10/2013 | Mahaffey et al. |
| 2013/0276114 A1 | 10/2013 | Friedrichs et al. |
| 2013/0298244 A1 * | 11/2013 | Kumar ................... G06F 21/52 726/25 |
| 2013/0312096 A1 | 11/2013 | Larsen et al. |
| 2013/0318568 A1 | 11/2013 | Mahaffey et al. |
| 2014/0090061 A1 | 3/2014 | Avasarala et al. |
| 2014/0096251 A1 * | 4/2014 | Doctor ................ H04L 63/1408 726/23 |
| 2014/0189861 A1 * | 7/2014 | Gupta .................... H04L 63/08 726/22 |
| 2015/0007312 A1 | 1/2015 | Pidathala et al. |
| 2015/0106927 A1 | 4/2015 | Ferragut et al. |
| 2015/0128263 A1 | 5/2015 | Raugas et al. |
| 2015/0135262 A1 | 5/2015 | Porat et al. |
| 2015/0172300 A1 | 6/2015 | Cochenour |
| 2015/0180883 A1 | 6/2015 | Aktas et al. |
| 2015/0205954 A1 | 7/2015 | Jou et al. |
| 2015/0244730 A1 | 8/2015 | Vu et al. |
| 2015/0244732 A1 | 8/2015 | Golshan et al. |
| 2015/0319185 A1 | 11/2015 | Kirti et al. |
| 2015/0373039 A1 | 12/2015 | Wang |
| 2016/0019388 A1 * | 1/2016 | Singla .................. G06F 21/552 726/23 |
| 2016/0065601 A1 | 3/2016 | Gong et al. |
| 2016/0212165 A1 * | 7/2016 | Singla .................. G06F 21/577 |
| 2016/0226905 A1 * | 8/2016 | Baikalov ............. H04L 63/1433 |
| 2016/0373478 A1 | 12/2016 | Doubleday et al. |
| 2017/0063894 A1 * | 3/2017 | Muddu ............... H04L 63/1425 |

OTHER PUBLICATIONS

Bayer, Ulrich, "TTAnalyze: A Tool for Analyzing Malware", Master's Thesis, Technical University of Vienna, Dec. 12, 2005.

Cavallaro, Lorenzo et al., "Anti-Taint-Analysis: Practical Evasion Techniques Against Information Flow Based Malware Defense", Secure Systems Lab at Stony Brook University, Tech. Rep, pp. 1-18, Nov. 2007.

Chen, Xu et al., "Towards an Understanding of Anti-Virtualization and Anti-Debugging Behavior in Modern Malware," In Proceedings of the 38th Annual IEEE International Conference on Dependable Systems and Networks (DSN), Jun. 24, 2008.

Ho, Alex et al., "Practical Taint-Based Protection Using Demand Emulation", EuroSys '06, Proceedings of the 1st ACM SIGOPS/EuroSys European Conference on Computer Systems 2006, vol. 40, Issue 4, pp. 29-41, Oct. 2006.

Kang, Min Gyung et al., "Emulating Emulation-Resistant Malware," In Proceedings of the Workshop on Virtual Machine Security (VMSec), Nov. 9, 2009.

Zhang, Xiao-Song et al., "A Practical Taint-Based Malware Detection", ICACIA 2008, International Conference on Apperceiving Computing and Intelligence Analysis, pp. 73-77, Dec. 2008.

Extended European Search Report in European Application No. 12844780.2, dated Jul. 22, 2015.

Extended European Search Report in European Application No. 12845692.8, dated Oct. 8, 2015.

International Preliminary Report on Patentability in International Application No. PCT/US2012/063566, dated May 15, 2014.

International Preliminary Report on Patentability in International Application No. PCT/US2012/063569, dated May 15, 2014.

International Search Report and Written Opinion in International Application No. PCT/US2012/063566, dated Jan. 22, 2013.

International Search Report and Written Opinion in International Application No. PCT/US2012/063569, dated Jan. 18, 2013.

International Search Report and Written Opinion in International Application No. PCT/US2015/017389, dated Dec. 11, 2015.

International Search Report and Written Opinion in International Application No. PCT/US2015/017394, dated Jun. 10, 2015.

Office Action in U.S. Appl. No. 13/288,905, dated May 21, 2013.
Office Action in U.S. Appl. No. 13/288,905, dated Feb. 19, 2014.
Office Action in U.S. Appl. No. 13/288,905, dated Oct. 23, 2014.
Office Action in U.S. Appl. No. 13/288,905, dated Jun. 4, 2015.
Office Action in U.S. Appl. No. 13/288,905, dated Jan. 20, 2016.
Office Action in U.S. Appl. No. 13/288,917, dated Sep. 12, 2013.
Office Action in U.S. Appl. No. 13/288,917, dated Jun. 30, 2014.
Office Action in U.S. Appl. No. 13/288,917, dated Dec. 3, 2014.
Office Action in U.S. Appl. No. 13/288,917, dated Jul. 13, 2015.
Office Action in U.S. Appl. No. 14/629,444, dated Feb. 9, 2016.
Office Action in U.S. Appl. No. 14/629,435, dated Apr. 1, 2016.

Extended European Search Report in European Application No. 16167215.9, dated Sep. 28, 2016.

International Preliminary Report on Patentability in International Application No. PCT/US2015/017389, dated Sep. 9, 2016.

International Preliminary Report on Patentability in International Application No. PCT/US2015/017394, dated Sep. 9, 2016.

Notice of Allowance in U.S. Appl. No. 13/288,905, dated Aug. 2, 2016.

Office Action in U.S. Appl. No. 13/288,917, dated Jun. 1, 2016.
Office Action in U.S. Appl. No. 14/629,444, dated Jun. 9, 2016.

(56) References Cited

OTHER PUBLICATIONS

Notice of Allowance in U.S. Appl. No. 14/629,444, dated Nov. 4, 2016.
International Search Report and Written Opinion in International Application No. PCT/US2016/061199, dated Feb. 6, 2017.
International Search Report and Written Opinion in International Application No. PCT/U52016/061201, dated Feb. 7, 2017.
Office Action in U.S. Appl. No. 13/288,917, dated Mar. 21, 2017.
Supplemental Notice of Allowance in U.S. Appl. No. 14/629,444, dated Feb. 16, 2017.
Office Action in U.S. Appl. No. 14/629,435, dated Dec. 22, 2016.
Office Action in U.S. Appl. No. 14/629,435, dated Jun. 15, 2017.
Office Action in U.S. Appl. No. 14/936,912, dated Apr. 21, 2017.
Notice of Allowance in U.S. Appl. No. 13/288,917, dated Aug. 11, 2017.
Supplemental Notice of Allowance in U.S. Appl. No. 13/288,905, dated Sep. 6, 2016.
Extended European Search Report corresponding to EP 15 75 2327, dated Sep. 19, 2017, 2 pages.

* cited by examiner

SYSTEM AND METHOD FOR THREAT RISK SCORING OF SECURITY THREATS

CROSS-REFERENCE TO RELATED APPLICATIONS

This is a continuation-in-part of U.S. patent application Ser. No. 14/629,444, filed on Feb. 23, 2015, which claims priority from U.S. Provisional Patent Application No. 61/944,006, filed on Feb. 24, 2014, each are hereby incorporated by reference in their entirety.

FIELD

Embodiments of the invention relate to protecting computers and networks from malicious software and activities. In particular, embodiments of the invention relate to a system and method for threat risk scoring of security threats.

BACKGROUND

Modern security threats are complex and vary in severity of likelihood to do damage to a network or a system. Such security threats include severity levels including potentially unwanted application ("PUA"), AdWare, Backdoor, and DataTheft Trojan. Further, potential for these types of threats to do damage to a network or a system may depend on the type of operating system, hardware, or network. The threats may only be effective against certain types of operating systems such as Windows XP or Mac OS X. At the time of detection, they may have just landed on a victim machine or already successfully installed itself. The same malware may be picked up by one brand of antivirus program for a digital device but not by another; the infected digital device may belong to the front desk or to the advanced R&D labs. For the IT security groups and incident response personnel, there needs to be a very practical method and system to take all these factors into consideration, to rate the risk for a given threat incident so that appropriate response actions can be taken timely and effectively to mitigate the risk.

Currently, antivirus vendors have used the notion of a "ThreatCon" level on their virus encyclopedia site, which is an indication of a global prevalence of a virus based on their observation. Some vendors have introduced a notion of a risk level of Internet applications, based on the likely security risk associated with the use of these applications on a network, e.g., use of an encrypted version of bittorrent on a network may have both bandwidth consumption and violation of copyright laws. However, these systems fail to act as a comprehensive system for quantifying risk and computing a risk score of a threat incident within the local context of a targeted environment. Further, these systems fail to provide a way to compute a risk score in real time.

SUMMARY

A system configured to generate a risk score for a threat activity including a digital device. The digital device configured to extract one or more threat events on a network based on metadata for one or more targeted digital devices on the network. Further, the digital device is configured to detect one or more incidents based on a correlation between at least a first threat event of the one or more threat events and a second threat event of the one or more threat events. And, the digital device is configured to generate a risk score for each of said one or more incidents.

Other features and advantages of embodiments will be apparent from the accompanying drawings and from the detailed description that follows.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Embodiments of a system to detect threat activities are configured to extract one or more threat activities on a network and to detect the incidents based on a correlation between the threat activities. Further, the system is configured to generate a risk score for the incidents detected to determine the type of risk the network is exposed to. The ability to inspect a network for threat activities in the context of the network environment they occur and to quantify the risk based on a risk score.

This system addresses the needs for rating the severity of a vulnerability and intrusion attacks to expend time and resources on those threat events that are actually a threat to the network. This addresses the problems with other rating systems that do not distinguish between threats such as a vulnerability or vulnerability exploit, which do not pose equal threats to the network. For example, an attacker can attempt to exploit a critical vulnerability (CVE-2014-6332, CVSS V2 Base score of 9.3, High) against a digital device, but the exploit may fail due to a mismatch of the operating system versions, thus posing no real threat. On the other hand, an attacker can trick an employee into installing a Trojan program on a digital device through social engineering and spear-phishing without involving any protocol vulnerability. And, the Trojan can start stealing confidential data from the machine. Moreover, an inside attacker can simply exfiltrate sensitive data without any observable infiltration steps, posing critical threats to the company. Thus, these threats would go undetected using present systems.

Similarly, a threat in its early stage of kill chain (e.g., an exploit) may require a different response action from one that has confirmed command-and-control ("CnC") activities. As these examples illustrate, there is a need to quantify incidents on a given network to address the real risk to the network and the digital devices. For example a threat targeting a core developer's machine may require prioritized attention over one targeting a reception desktop.

The system and method, according to embodiments described herein, provide ways to quantify a risk with respect to a given targeted environment, which provides the benefit of determining a successful and cost-effective way of mitigating the threat. There is yet no practical threat scoring system that can take into account a comprehensive set of factors to determine the risk level of modern threats in real time. The embodiments herein address these issues.

Figure 1:
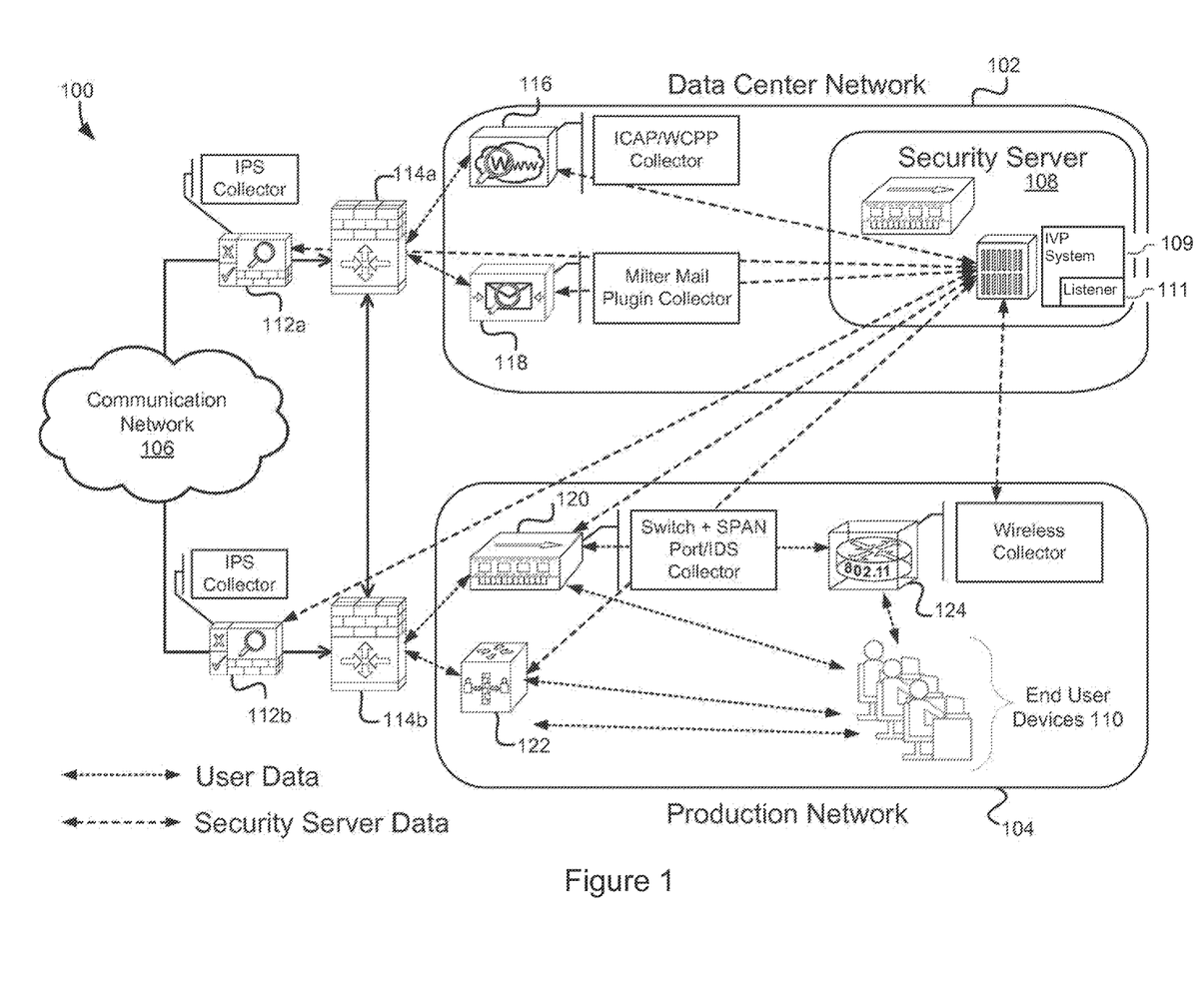
FIG. 1 illustrates a block diagram of a network environment that includes a system configured to detect threat activities according to an embodiment.
Figure 3:
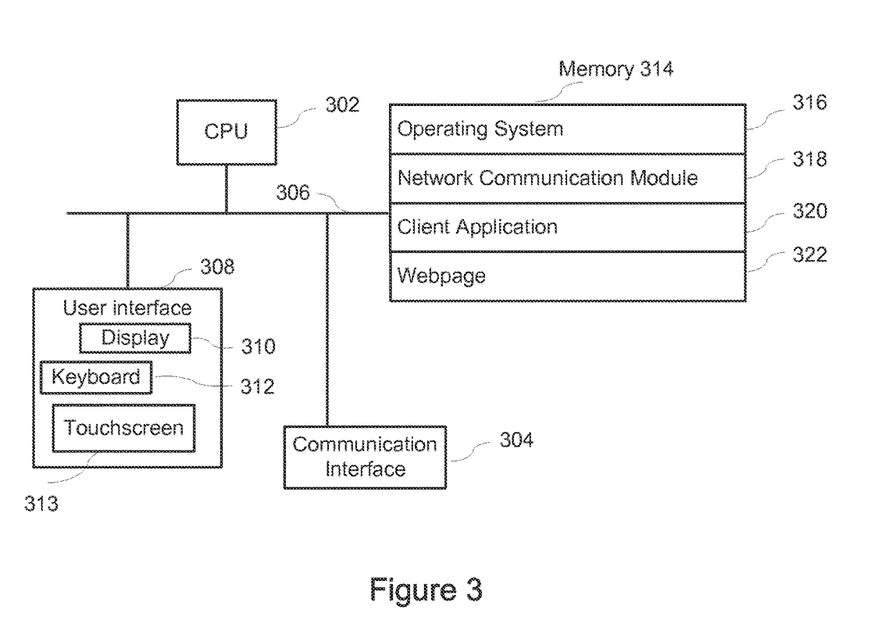
FIG. 3 illustrates an embodiment of a client or a digital device according to an embodiment.
Figure 4:
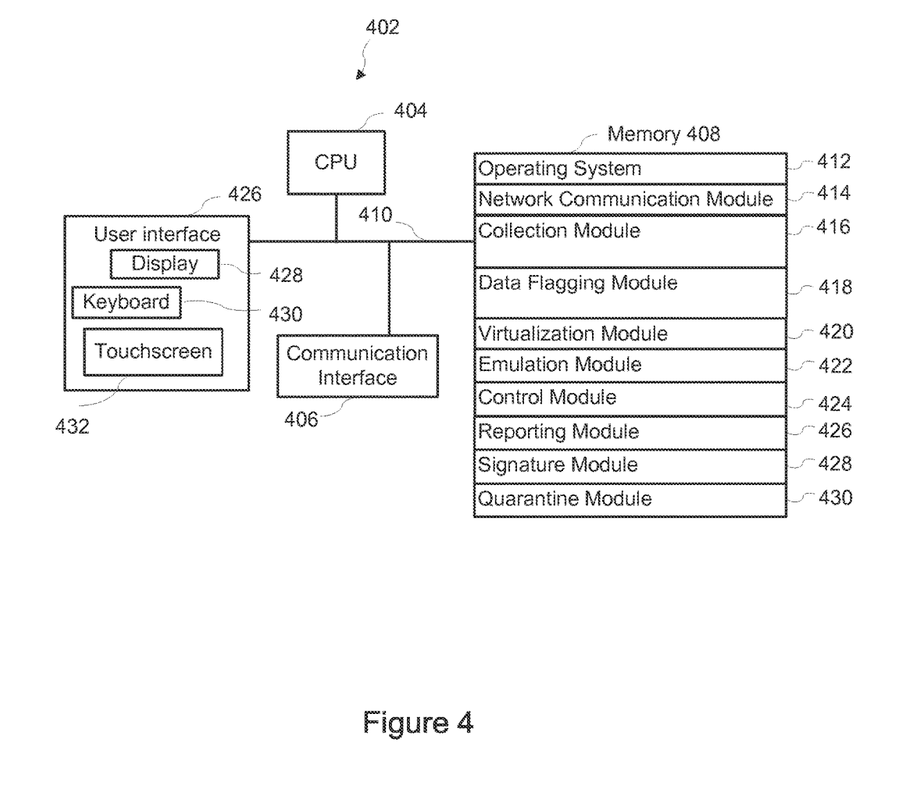
FIG. 4 illustrates an embodiment of a system for detecting threat activities according to an embodiment.

FIG. 1 illustrates a block diagram of a network environment 100 that includes a system configured to detect threat activities according to an embodiment. Systems and methods embodied in the network environment 100 may detect threat activity, malicious activity, identify malware, identify exploits, take preventive action, generate signatures, generate reports, determine malicious behavior, determine targeted information, recommend steps to prevent attack, and/or provide recommendations to improve security. The network environment 100 comprises a data center network 102 and a production network 104 that communicate over a communication network 106. The data center network 102 comprises a security server 108. The production network 104 comprises a plurality of end-user devices 110. The security server 108 and the end-user devices 110 may include digital devices. A digital device is any device with one or more a processing units and memory. FIGS. 3 and 4 illustrate embodiments of a digital device.

The security server 108 is a digital device configured to detect threat activities. For an embodiment, the security server 108 receives suspicious data from one or more data collectors. The data collectors may be resident within or in communication with one or more network devices such as Intrusion Prevention System ("IPS") collectors 112a and 112b, firewalls 114a and 114b, ICAP/WCCP collectors 116, milter mail plug-in collectors 118, switch collectors 120, and/or access points 124. Those skilled in the art will appreciate that a collector and a network device may be two separate digital devices (e.g., see F/W collector and IDS collector).

For an embodiment, data collectors may be at one or more points within the communication network 106. A data collector, which may include a tap or span port (e.g., span port IDS collector at switch 120) for example, is configured to intercept network data from a network. The data collector may be configured to detect suspicious data. Suspicious data is any data collected by the data collector that has been flagged as suspicious by the data collector and/or any data that is to be further analyzed by the security server 108 including within the virtualization environment.

The data collectors may filter the data before flagging the data as suspicious and/or providing the collected data to the security server 108. For example, the data collectors may filter out plain text but collect executables or batch files. Further, according to an embodiment, the data collectors may perform intelligent collecting. For example, data may be hashed and compared to a whitelist. The whitelist may identify data that is safe. In one example, the whitelist may identify digitally signed data or data received from a known trusted source as safe. Further, the whitelist may identify previously received information that has been determined to be safe. If data has been previously received, tested within the environments, and determined to be sufficiently trustworthy, the data collector may allow the data to continue through the network. Those skilled in the art will appreciate that the data collectors (or agents associated with the data collectors) may be updated by the security server 108 to help the data collectors recognize sufficiently trustworthy data and to take corrective action (e.g., quarantine and alert an administrator) if untrustworthy data is recognized. For an embodiment, if data is not identified as safe, the data collectors may flag the data as suspicious for further analysis.

Those skilled in the art will appreciate that one or more agents or other modules may monitor network traffic for common behaviors and may configure a data collector to collect data when data is directed in a manner that falls outside normal parameters. For example, the agent may determine or be configured to detect that a computer has been deactivated, a particular computer does not typically receive any data, data received by a particular computer typically comes from a limited number of sources, or a particular computer typically does not send data of a given pattern to certain destinations. If data is directed to a digital device in a manner that is not typical, the data collector may flag such data as suspicious and provide the suspicious data to the security server 108.

Network devices include any device configured to receive and provide data over a network. Examples of network devices include, but are not limited to, routers, bridges, security appliances, firewalls, web servers, mail servers, wireless access points (e.g., hotspots), and switches. For some embodiments, network devices include IPS collectors 112a and 112b, firewalls 114a and 114b, Internet content adaptation protocol ("ICAP")/web cache communication protocol ("WCCP") servers 116, devices including milter mail plug-ins 118, switches 120, and/or access points 124. The IPS collectors 112a and 112b may include any anti-malware device including IPS systems, intrusion detection and prevention systems ("IDPS"), or any other kind of network security appliances. The firewalls 114a and 114b may include software and/or hardware firewalls. For an embodiment, the firewalls 114a and 114b may be embodied within routers, access points, servers (e.g., web servers), mail filters, or appliances.

ICAP/WCCP servers 116 include any web server or web proxy server configured to allow access to a network and/or the Internet. Network devices including milter mail plug-ins 118 may include any mail server or device that provides mail and/or filtering functions and may include digital devices that implement milter, mail transfer agents ("MTAs"), sendmail, and postfix, for example. Switches 120 include any switch or router. In some examples, the data collector may be implemented as a TAP, SPAN port, and/or intrusion detection system ("IDS"). Access points 124 include any device configured to provide wireless connectivity with one or more other digital devices.

The production network 104 is any network that allows one or more end-user devices 110 to communicate over the communication network 106. The communication network 106 is any network that may carry data (encoded, compressed, and/or otherwise) from one digital device to another. In some examples, the communication network 106 may comprise a LAN and/or WAN. Further, the communication network 106 may comprise any number of networks. For some embodiments, the communication network 106 is the Internet.

FIG. 1 is exemplary and does not limit systems and methods described herein to the use of only those technologies depicted. For example, data collectors may be implemented in any web or web proxy server and is not limited to only the servers that implement Internet content adaption protocol ("ICAP") and/or web cache communication protocol ("WCCP"). Similarly, data collectors may be implemented in any mail server and is not limited to mail servers that implement milter. Data collectors may be implemented at any point in one or more networks.

Those skilled in the art will appreciate that although FIG. 1 depicts a limited number of digital devices, collectors, routers, access points, and firewalls, there may be any kind and number of devices. For example, there may be any number of security servers 108, end-user devices 110, intrusion prevention system ("IPS") collectors 112a and 112b, firewalls 114a and 114b, ICAP/WCCP collectors 116, milter mail plug-ins 118, switches 120, and/or access points 124. Further, there may be any number of data center networks 102 and/or production networks 104.

Figure 2:
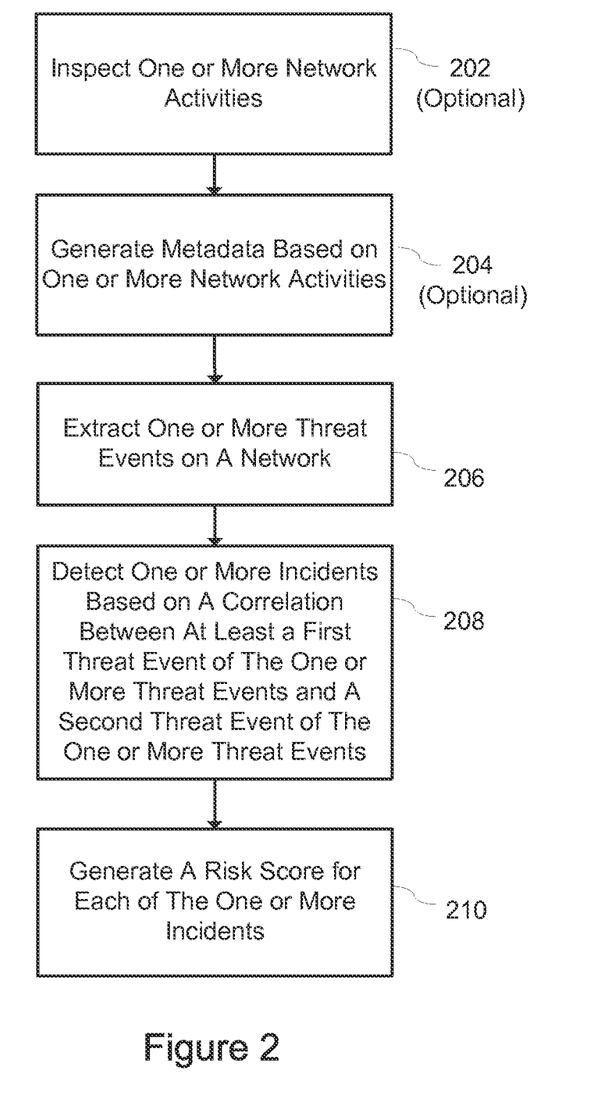
FIG. 2 illustrates a flow diagram of a method to detect threat activities on a network according to an embodiment.

FIG. 2 illustrates a block diagram of a method for threat risk scoring according to an embodiment. The method may be implemented on embodiments of a system as described herein. The method optionally includes inspecting one or more network activities to detect threat events (202). A network activity includes, but is not limited to, live traffic, a file extraction, and an event in an activity log. Further, inspection of a network activity may take place at different physical locations on a network, through hardware, software, or virtual appliances using techniques including those described herein. The inspecting may also include inspecting one or more protocols and applications using techniques including those described herein. An application may include, but is not limited to, any client application or business application that executes on a digital device, such as a web application and an e-mail application. For an embodiment, inspecting includes using one or more detection techniques including, but not limited to, static analysis, sandbox detonation, machine learning based classification, and other techniques including those described herein. For an embodiment, the one or more detection techniques are run in parallel on a system.

For an embodiment one or more data collectors are configured to intercept network data between network devices to inspect network activities using techniques including those described herein. For example, a data collector is configured to inspect network traffic between network devices across the protocol stack. A data collector, for an embodiment, is configured to inspect on one or more protocol stack layers including, but not limited to, layers 2-7 using techniques including those described herein. For example, the data collector may be configured to inspect protocols including, but not limited to, address resolution protocol ("ARP") traffic, dynamic host configuration protocol ("DHCP") traffic, Internet control message protocol ("ICMP") traffic between media access control ("MAC") or Internet protocol ("IP") addresses, transmission control protocol ("TCP")/IP and user datagram protocol ("UDP")/IP traffic between IP and port number pairs, up the stack to hypertext transfer protocol ("HTTP"), secure shell ("SSH"), server message block ("SMB") application protocols, patterns between application clients and servers, and industry-specific applications like wire transfer transaction processing, and patterns between bank accounts. The data collector is configured to transmit the results of the inspection to a security server using techniques including those described herein.

The method also optionally includes generating metadata based on one or more network activities (204). For example, the method includes generating metadata including location information, address information, time, type of activity, destination address, source address, coordinates of entities involved in a command-and-control, also known as Call-Back, activity, which include the IP address of CnC controller, also known as the CallBack server, the IP address of the client computer which represents the machine infected by the corresponding malware, the representation of the HTTP traffic portion that matched CnC detection rule, a list of URLs representing an HTTP redirect chain by which a client machine gets infected by a drive-by download attack and other information used to characterize or describe a network activity. For an embodiment, a data collector is configured to generate metadata based on one or more network activities. For an embodiment, a security server is configured to generate metadata based on the inspection results received from one or more data collectors using techniques including those described herein.

In addition, the method includes extracting one or more threat events on a network (206). For an embodiment, extracting one or more threat events on a network is based on metadata received from one or more targets such as a digital device, on the network. For another embodiment, extracting one or more threat events on a network is based on metadata generated based on network activities as described above, for example, network activities on a target. For an embodiment, a security server is configured to extract one or more threat events based on metadata received using techniques including those described herein. For an embodiment, a data collector is configured to generate metadata for a threat event such as a timestamp to indicate the time the threat event was extracted. For example, when the traffic pattern indicates repeated failures of remote SSH access from a given client computer to server, this is extracted as a threat event suggesting a potential brute force attack on the server. The extraction of this threat is achieved with rules counting the number of failed attempts for SSH connection to the server. Another example is simply matching an exploit signature in, e.g., reliable user datagram protocol ("RDP") traffic, extracting another event of attack against an RDP service on the targeted computer. For this example, a data collector is configured to generate metadata for this event that includes the timestamp, client and server IP addresses, and the vulnerability information such as a CVE name.

The method also includes detecting one or more incidents based on a correlation between at least a first threat event and a second threat event (208). The correlation, for an embodiment, takes into account how a threat evolves through kill chain stages, that is, a life cycle of an attack. For example, a threat event includes, but is not limited to, an exploit, a downloaded file, malware, and data theft. An example of an exploit includes a piece of an attack payload being delivered through an exploit in a client application such as web browser. Another example of an incident is a piece of malware being downloaded before it can be installed on a targeted digital device. A correlation between threat events is determined through a kill chain progression relationship, a digital device targeted by the threat event, a time interval of interest, and other threat event attributes, for example, those indicated through metadata. Threat event attributes may include, but are not limited to, file checksums, such as MD5, SHA1, SHA256, and other hash or fingerprinting techniques. For an embodiment, a correlation between threat events occurs when the threat events occur on the same digital device or subnet within in a time interval. The time interval may be determined based on experimental and/or empirical determinations.

For an embodiment, a time interval is five minutes. An example of detecting an incident based on a correlation between threat events during a time interval of five minutes includes an exploit on an digital device having an IP address of 10.0.0.1 at 10:00 am, a downloaded file on the digital device at IP address 10.0.0.1 is detected at 10:04 am, and a malware infection on the digital device at IP address 10.0.0.1 is detected at 10:08 am. Such a kill chain progression would be detected and an exploit ("EX")+download ("DL")+infection ("IN") incident based on the correlation of the above threat events. Another example includes detecting two incidents based on a correlation between threat events using a time interval of five minutes includes an exploit on an digital device having an IP address of 10.0.0.1 at 10:00 am, a downloaded file on the digital device at IP address 10.0.0.1 is detected at 10:01 am, and a malware infection on the digital device at IP address 10.0.0.1 is detected at 10:08 am. Such a kill chain progression would be detected as two incidents: an EX+DL incident and an IN incident. For an embodiment, a security server is configured to detect one or more incidents based on a correlation between at least a first threat event and a second threat event using techniques including those described herein.

Further, the method includes generating a risk score for each of the one or more incidents (210). The risk score is used to determine the significance of an incident detected. For an embodiment, a risk score is generated based on an asset value, a threat severity value, and a threat relevance value. The asset value is used to assign a value to indicate the importance of a digital device. The threat severity value is used to indicate how significant a threat is to a digital device or the network. For an embodiment, the asset value and threat severity value are values in a range from 0 to 1. The threat relevance value is a scaling factor which indicates the threat significance of an incident to a digital device.

Asset value is used to indicate how critical a digital device is to the local business and/or the business risk implication of a breach on the targeted digital device. For an embodiment, the asset value is in a range from 0 to 1. For example, an asset value can have 4 predefined values: 0.25—low asset importance; 0.50—medium asset importance; 0.75—high asset importance; and 1.0—critical asset importance. An asset value can also be assigned for a subnet including one or more digital devices. For an embodiment, a default asset value of 0.50 is used.

A threat severity value is assigned a value, according to an embodiment, based on the progression of an incident through a kill chain and the type of an incident. For example, an exploit incident is set to a value of 0.25. For a malware download incident, the value is based on a type of the download. For example, a benign download is assigned a value of 0; an adware download, a suspicious download, and a Trojan_DDOS download are assigned a value of 0.25; a virus download and a worm download is assigned a value of 0.50; a Trojan_Ransom, a Trojan Hijack, a Trojan_Generic, a Trojan_Backdoor downloads are assigned a value of 0.75; and an exploit download, a Trojan_Phishing download, and a Trojan_Datatheft download are assigned a value of 1.

For an embodiment, threat relevance is based on progression, operation system ("OS") match, and antivirus vendor ("AV") match. Progression indicates the progression of incidents in a kill chain progression at the time it is extracted, which include from least severe to most severe: exploit ("EX"), download ("DL"), execution ("EN"), infection ("IN"), and data theft ("DT"). For example, an execution is determined based on a security application running on a digital device, such as an end-user device. Each malware object that the system has seen downloaded will be checked on the digital device using the security application to determine if that malware object has been executed. If so, the progress level is updated to EN for the device by the system. For an embodiment, whenever there is evidence that the progression of an incident is at the stage of execution the threat relevance value is set to 1.0, nullifying the reduction effect to the risk score, because the execution confirms that the threat is relevant. However, according to an embodiment, when there is only evidence that the threat has progressed to EX or DL stage, the relevance value is set to 0.5 or 0.75 to signify that the threat may not have taken its full effect on the targeted device, resulting in a lower risk score for the threat incident.

The OS match and the AV vender match, for an embodiment, act to decrease the value of the threat relevance. For example, if the OS of a digital device is determined to be a mismatch with the OS that an incident is designed for (that is, cannot be executed on or otherwise affect the digital device), then a threat relevance reduction is applied. The threat relevance value is reduced by 0.33 according to an embodiment. If the OS is found to match with the incident, or the OS cannot be determined, then no threat relevance reduction is applied to the threat relevance value. This represents a security posture of high alert, which can be changed for another embodiment. For an embodiment, the OS of a digital device is determined based on metadata received from an application running on a digital device, such as a user-agent of a download or a security application.

For the AV vender match, a system is configured to determine the one or more AV vendors used on a digital device. For example, the system is configured to use metadata received from an antivirus database that indicates if any AV vendor on a digital device is capable of catching the detected incident. If the AV vendor on the digital device is capable of catching the detected incident, then a threat relevance value reduction is applied. The threat relevance value is reduced by 0.33 according to an embodiment. If the AV vendor is not capable of catching the incident, or the AV vender of the digital device cannot be determined, then no threat relevance reduction is applied. This represents a security posture of high alert, which can be adjusted for other posture designs.

The risk score is used to parameterize the set of risk factors, and link them by a mathematical formula so that, a risk score can be calculated in real time for every threat incident. This achieves a rational, accurate, and intuitive accounting for various threats and environments. The formula used to generate a risk score can be easily updated to account for additional risk factors as well new interpretations for emerging environments. For example, one formula used to generate a risk score includes:

$$\text{Risk Score} = 0.3*\text{Severity} + 0.3*\text{Progression} + 0.2*\text{Threat Relevance} + 0.2*\text{Asset Value}$$

where Severity is the threat severity value as describe herein, Progression is the value assigned based on the stage of progression of incidents in a kill chain progression as described herein, Threat Relevance is the value assigned as described herein, and Asset Value is the asset value assigned to an incident as described herein.

Another example of a formula that can be used to generate a risk score includes:

$$\text{Score} = \text{MAX}(\text{Threat Severity} + (\text{Asset Value} - 0.50)), 0.25)*(\text{Threat Relevance})$$

where Threat Severity is the threat severity value as describe herein, Asset Value is the asset value assigned to an incident as described herein, and Threat Relevance is the value assigned as described herein. Further, MAX is a function that determines the maximum value between (Threat Severity+(Asset Value−0.50) and 0.25. Using this formula to generate a risk score, results in a maximum risk score of 1.0 and the risk score falling in the range from 0 to 1. For an embodiment, when an incident is based on multiple correlated threat events, each event score is calculated, and the highest event score is applied to this incident. For an embodiment, a security server is configured to generate a risk score for each of the one or more incidents using techniques including those described herein.

FIG. 3 illustrates an embodiment of a client or a digital device, such as an end-user device, that includes one or more processing units (CPUs) 302, one or more network or other communications interfaces 304, memory 314, and one or more communication buses 306 for interconnecting these components. The client may include a user interface 308 comprising a display device 310, a keyboard 312, a touchscreen 313 and/or other input/output device. Memory 314 may include high speed random access memory and may also include non-volatile memory, such as one or more magnetic or optical storage disks. The memory 314 may include mass storage that is remotely located from CPUs 302. Moreover, memory 314, or alternatively one or more storage devices (e.g., one or more nonvolatile storage devices) within memory 314, includes a computer readable storage medium. The memory 314 may store the following elements, or a subset or superset of such elements:

- an operating system 316 that includes procedures for handling various basic system services and for performing hardware dependent tasks;
- a network communication module 318 (or instructions) that is used for connecting the client to other computers, clients, servers, systems or digital devices via the one or more communications network interfaces 304 and one or more communications networks, such as the Internet, other wide area networks, local area networks, metropolitan area networks, and other type of networks; and
- a client application 320 including, but not limited to, a web browser, a document viewer and other applications including those described herein; and
- a webpage 322 including one generated by the client application 320 configured to receive a user input to communicate across a network with other computers or digital devices.

According to an embodiment, the client may be any digital device that includes, but is not limited to, a mobile phone, a computer, a tablet computer, a personal digital assistant (PDA) or other mobile device.

FIG. 4 illustrates an embodiment of a server or a network device, such as a system that implements one or more aspects of the methods described herein. The system, according to an embodiment, includes one or more processing units (CPUs) 404, one or more communication interface 406, memory 408, and one or more communication buses 410 for interconnecting these components. The system 402 may optionally include a user interface 426 comprising a display device 428, a keyboard 430, a touchscreen 432, and/or other input/output devices. Memory 408 may include high speed random access memory and may also include non-volatile memory, such as one or more magnetic or optical storage disks. The memory 408 may include mass storage that is remotely located from CPUs 404. Moreover, memory 408, or alternatively one or more storage devices (e.g., one or more nonvolatile storage devices) within memory 408, includes a computer readable storage medium. The memory 408 may store the following elements, a subset, or superset of such elements: an operating system 412, a network communication module 414, a collection module 416, a data flagging module 418, a virtualization module 420, an emulation module 422, a control module 424, a reporting module 426, a signature module 428, and a quarantine module 430. An operating system 412 that includes procedures for handling various basic system services and for performing hardware dependent tasks. A network communication module 414 (or instructions) that is used for connecting the system to other computers, clients, peers, systems or devices via the one or more communication network interfaces 406 and one or more communication networks, such as the Internet, other wide area networks, local area networks, metropolitan area networks, and other type of networks.

A collection module 416 (or instructions) for detecting one or more network activities and other suspicious data using techniques including those described herein. Further, the collection module 416 is configured to receive network data (e.g., potentially suspicious data) from one or more sources. Network data is data or network traffic that is provided on a network from one digital device to another. The collection module 416 may flag the network data as suspicious data based on, for example, whitelists, blacklists, heuristic analysis, statistical analysis, rules, atypical behavior, or other determinations using techniques including those described herein. In some embodiments, the sources comprise data collectors configured to receive network data. For example, firewalls, IPS, servers, routers, switches, access points and the like may, either individually or collectively, function as or include a data collector. The data collector may forward network data to the collection module 416.

For an embodiment, the data collectors filter the data before providing the data to the collection module 416. For example, the data collector may be configured to collect or intercept data using techniques including those described herein. In some embodiments, the data collector may be configured to follow configured rules. For example, if data is directed between two known and trustworthy sources (e.g., the data is communicated between two devices on a whitelist), the data collector may not collect the data. In various embodiments, a rule may be configured to intercept a class of data (e.g., all MS Word documents that may include macros or data that may comprise a script). In some embodiments, rules may be configured to target a class of attack or payload based on the type of malware attacks on the target network in the past. In some embodiments, the system may make recommendations (e.g., via the reporting module 426) and/or configure rules for the collection module 416 and/or the data collectors. Those skilled in the art will appreciate that the data collectors may include any number of rules regarding when data is collected or what data is collected.

For an embodiment, the data collectors located at various positions in the network may not perform any assessment or determination regarding whether the collected data is suspicious or trustworthy. For example, the data collector may collect all or a portion of the network traffic/data and provide the collected network traffic/data to the collection module 416 which may perform analysis and/or filtering using techniques including those described herein.

A data flagging module 418 (or instructions) may analyze the data and/or perform one or more assessments to the collected data received by the collection module 416 and/or the data collector to determine if the intercepted network data is suspicious using techniques including those describe herein. The data flagging module 418 may apply rules, compare real-time observations with one or more behavior profiles, generate one or more anomalies based on a comparison of real-time observations with at least one behavior profile, and/or extract one or more threat events using techniques including those described herein. Further, a data flagging module 418 may be configured to detect one or more incidents based on a correlation between one or more threat events and to generate a risk score using techniques including those described herein.

For an embodiment, collected network traffic/data may be initially identified as suspicious until determined otherwise (e.g., associated with a whitelist) or heuristics find no reason that the network data should be flagged as suspicious. The data flagging module 418 may perform packet analysis to look for suspicious characteristics in the header, footer, destination IP, origin IP, payload, and the like using techniques including those described herein. Those skilled in the art will appreciate that the data flagging module 418 may perform a heuristic analysis, a statistical analysis, machine learning, and/or signature identification (e.g., signature-based detection involves searching for known patterns of suspicious data within the collected data's code) to determine if the collected network data is suspicious.

The data flagging module 418 may be resident at the data collector, at the system, partially at the data collector, partially at a security server 108, or on a network device. For example, a router may comprise a data collector and a data flagging module 418 configured to perform one or more heuristic assessments on the collected network data. If the collected network data is determined to be suspicious, the router may direct the collected data to the security server 108.

For an embodiment, the data flagging module 418 may be updated. In one example, the security server 108 may provide new entries for a whitelist, entries for a blacklist, heuristic algorithms, statistical algorithms, updated rules, and/or new signatures to assist the data flagging module 418 to determine if network data is suspicious. The whitelists, entries for whitelists, blacklists, entries for blacklists, heuristic algorithms, statistical algorithms, and/or new signatures may be generated by one or more security servers 108 (e.g., via the reporting module 426).

The virtualization module 420 and emulation module 422 may analyze suspicious data for untrusted behavior (e.g., malware or distributed attacks). The virtualization module 420 is configured to instantiate one or more virtualization environments to process and monitor suspicious data. Within the virtualization environment, the suspicious data may operate as if within a target digital device. The virtualization module 420 may monitor the operations of the suspicious data within the virtualization environment to determine that the suspicious data is probably trustworthy, malware, or requiring further action (e.g., further monitoring in one or more other virtualization environments and/or monitoring within one or more emulation environments). For an embodiment, the virtualization module 420 monitors modifications to a system, checks outbound calls, and checks tainted data interactions.

For an embodiment, the virtualization module 420 may determine that suspicious data is a threat event, such as malware, but continue to process the suspicious data to generate a full picture of the malware, identify the vector of attack, determine the type, extent, and scope of the malware's payload, determine the target of the attack, and detect if the malware is to work with any other malware. In this way, the security server 108 may extend predictive analysis to actual applications for complete validation. A report may be generated (e.g., by the reporting module 426) describing the malware, identify vulnerabilities, generate or update signatures for the malware, generate or update heuristics or statistics for malware detection, generate a report identifying the targeted information (e.g., credit card numbers, passwords, or personal information) and/or generate an incident alert as described herein.

For an embodiment, the virtualization module 420 may flag suspicious data as requiring further emulation and analytics in the back end if the data has suspicious behavior such as, but not limited to, preparing an executable that is not executed, performing functions without result, processing that suddenly terminates, loading data into memory that is not accessed or otherwise executed, scanning ports, or checking in specific portions of memory when those locations in memory may be empty. The virtualization module 420 may monitor the operations performed by or for the suspicious data and perform a variety of checks to determine if the suspicious data is behaving in a suspicious manner. Further, a virtualization module is configured to instantiate a browser cooking environment such as those described herein.

The emulation module 422 is configured to process suspicious data in an emulated environment. Those skilled in the art will appreciate that malware may require resources that are not available or may detect a virtualization environment. When malware requires unavailable resources, the malware may "go benign" or act in a non-harmful manner. In another example, malware may detect a virtualization environment by scanning for specific files and/or memory necessary for hypervisor, kernel, or other virtualization data to execute. If malware scans portions of its environment and determines that a virtualization environment may be running, the malware may "go benign" and either terminate or perform nonthreatening functions.

For an embodiment, the emulation module 422 processes data flagged as behaving suspiciously in addition to or instead of a virtualization environment. The emulation module 422 may process the suspicious data in one or more bare metal environments where the suspicious data may have direct memory access. The behavior of the suspicious data as well as the behavior of the emulation environment may be monitored and/or logged to track the suspicious data's operations. For example, the emulation module 422 may track what resources (e.g., applications and/or operating system files) are called in processing the suspicious data.

For an embodiment, the emulation module 422 records responses to the suspicious data in the emulation environment. If a divergence in the operations of the suspicious data between the virtualization environment and the emulation environment is detected, the virtualization environment may be configured to inject the response from the emulation environment. The suspicious data may receive the expected response within the virtualization environment and continue to operate as if the suspicious data was within the targeted digital device. The role of the emulation environment and the virtualization environment and the order of using the environments may be swapped.

A control module 424 (or instructions) control module 424 synchronizes the virtualization module 420 and the emulation module 422. For an embodiment, the control module 424 synchronizes the virtualization and emulation environments. For example, the control module 424 may direct the virtualization module 420 to instantiate a plurality of different virtualization environments with different resources. The control module 424 may compare the operations of different virtualization environments to each other in order to track points of divergence. For example, the control module 424 may identify suspicious data as operating in one manner when the virtualization environment includes, but is not limited to, Internet Explorer v. 7.0 or v. 8.0, but operating in a different manner when interacting with Internet Explorer v. 6.0 (e.g., when the suspicious data exploits a vulnerability that may be present in one version of an application but not present in another version).

The control module 424 may track operations in one or more virtualization environments and one or more emulation environments. For example, the control module 424 may identify when the suspicious data behaves differently in a virtualization environment in comparison with an emulation environment. Divergence and correlation analysis is when operations performed by or for suspicious data in a virtual environment is compared to operations performed by or for suspicious data in a different virtual environment or emulation environment. For example, the control module 424 may compare monitored steps of suspicious data in a virtual environment to monitored steps of the same suspicious data in an emulation environment. The functions or steps of or for the suspicious data may be similar but suddenly diverge. In one example, the suspicious data may have not detected evidence of a virtual environment in the emulation environment and, unlike the virtualization environment where the suspicious data went benign, the suspicious data undertakes actions characteristic of malware (e.g., hijacks a formerly trusted data or processes).

When divergence is detected, the control module 424 may re-provision or instantiate a virtualization environment with information from the emulation environment (e.g., a page table including state information and/or response information further described herein) that may not be previously present in the originally instantiation of the virtualization environment. The suspicious data may then be monitored in the new virtualization environment to further detect suspicious behavior or untrusted behavior. Those skilled in the art will appreciate that suspicious behavior of an object is behavior that may be untrusted or malicious. Untrusted behavior is behavior that indicates a significant threat.

For an embodiment, the control module 424 is configured to compare the operations of each virtualization environment in order to identify suspicious or untrusted behavior. For example, if the suspicious data takes different operations depending on the version of a browser or other specific resource when compared to other virtualization environments, the control module 424 may identify the suspicious data as malware. Once the control module 424 identifies the suspicious data as malware or otherwise untrusted, the control module 424 may continue to monitor the virtualization environment to determine the vector of attack of the malware, the payload of the malware, and the target (e.g., control of the digital device, password access, credit card information access, and/or ability to install a bot, keylogger, and/or rootkit). For example, the operations performed by and/or for the suspicious data may be monitored in order to further identify the malware, determine untrusted acts, and log the effect or probable effect.

A reporting module 426 (or instructions) is configured to generate a data model based on a generated list of events. Further a reporting module 426 is configured to generate reports such as an incident alert. For an embodiment, the reporting module 426 generates a report to identify malware, one or more vectors of attack, one or more payloads, target of valuable data, vulnerabilities, command and control protocols, and/or behaviors that are characteristics of the malware. The reporting module 426 may also make recommendations to safeguard information based on the attack (e.g., move credit card information to a different digital device, require additional security such as VPN access only, or the like).

For an embodiment, the reporting module 426 generates malware information that may be used to identify malware or suspicious behavior. For example, the reporting module 426 may generate malware information based on the monitored information of the virtualization environment. The malware information may include a hash of the suspicious data or a characteristic of the operations of or for the suspicious data. In one example, the malware information may identify a class of suspicious behavior as being one or more steps being performed by or for suspicious data at specific times. As a result, suspicious data and/or malware may be identified based on the malware information without virtualizing or emulating an entire attack.

A signature module 428 (or instructions) is configured to classify network traffic/data based on said list of events. Further a signature module 428 is configured to store signature files that may be used to identify malware and/or traffic patterns. The signature files may be generated by the reporting module 312 and/or the signature module 428. In various embodiments, the security server 108 may generate signatures, malware information, whitelist entries, and/or blacklist entries to share with other security servers. As a result, the signature module 428 may include signatures generated by other security servers or other digital devices. Those skilled in the art will appreciate that the signature module 428 may include signatures generated from a variety of different sources including, but not limited to, other security firms, antivirus companies, and/or other third-parties.

For an embodiment, the signature module 428 may provide signatures which are used to determine if network traffic/data is suspicious or is malware. For example, if network traffic/data matches the signature of known malware, then the network data may be classified as malware. If network data matches a signature that is suspicious, then the network data may be flagged as suspicious data. The malware and/or the suspicious data may be processed within a virtualization environment and/or the emulation environment as discussed herein.

A quarantine module 430 (or instructions) is configured to quarantine suspicious data and/or network traffic/data. For an embodiment, when the security server 108 identifies malware or probable malware, the quarantine module 430 may quarantine the suspicious data, network data, and/or any data associated with the suspicious data and/or network data. For example, the quarantine module 430 may quarantine all data from a particular digital device that has been identified as being infected or possibly infected. For an embodiment, the quarantine module 430 is configured to alert a security administrator or the like (e.g., via email, call, voicemail, or SMS text message) when malware or possible malware has been found.

Although FIG. 4 illustrates system 402 as a computer it could be a distributed system, such as a server system. The figures are intended more as functional descriptions of the various features which may be present in a client and a set of servers than as a structural schematics of the embodiments described herein. Thus, one of ordinary skill in the art would understand that items shown separately could be combined and some items could be separated. For example, some items illustrated as separate modules in FIG. 4 could be implemented on a single server or client and single items could be implemented by one or more servers or clients. The actual number of servers, clients, or modules used to implement a system 402 and how features are allocated among them will vary from one implementation to another, and may depend in part on the amount of data traffic that the system must handle during peak usage periods as well as during average usage periods. In addition, some modules or functions of modules illustrated in FIG. 4 may be implemented on one or more one or more systems remotely located from other systems that implement other modules or functions of modules illustrated in FIG. 4.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A system comprising:
 a device to:
  inspect one or more network activities on a network;
  generate metadata associated with malware activity based on inspecting the one or more network activities;
  extract one or more threat events on the network based on the metadata;
  detect one or more incidents based on a correlation between a first threat event, of the one or more threat events, and a second threat event of the one or more threat events,
   the correlation being determined based on the metadata and a kill chain progression of the one or more threat events;
  generate risk scores for the one or more incidents based on the kill chain progression,
   the risk scores being based on one or more asset values for one or more targeted devices, and
   a first score, associated with a first stage of the kill chain progression, of the risk scores being lower than a second score, associated with a second stage of the kill chain progression, of the risk scores; and
  mitigate the one or more incidents based on the risk scores,
   the mitigation including quarantining data associated with the one or more network activities.

2. The system of claim 1, wherein the device, when inspecting the one or more network activities, is to:
 inspect the one or more network activities using at least one of:
  static analysis,
  sandbox detonation, or
  machine learning.

3. The system of claim 1, wherein the device, when inspecting the one or more network activities, is to:
 inspect one or more protocols.

4. The system of claim 1, wherein the device, when inspecting the one or more network activities, is to:
 inspect one or more applications; and
 wherein the device, when generating the metadata, is to:
  generate the metadata based on inspecting the one or more applications.

5. The system of claim 1, wherein the one or more threat events are time stamped.

6. The system of claim 1, wherein the device is further to:
 correlate the one or more threat events based on a time stamp for each of the one or more threat events.

7. The system of claim 1, wherein the device is further to:
 correlate the one or more threat events based on an Internet protocol address for each of the one or more threat events.

8. The system of claim 1, wherein the device is further to:
 correlate the one or more threat events over a period of time.

9. The system of claim 1, wherein the risk scores are based on a threat severity value associated with the one or more incidents.

10. The system of claim 1, wherein the risk scores are based on a threat relevance value associated with the one or more incidents.

11. The system of claim 1, where the device is further to:
 process the data associated with the one or more network activities in an emulated environment.

12. A non-transitory computer-readable medium storing instructions, the instructions comprising:
 one or more instructions that, when executed by one or more processors, cause the one or more processors to:
  inspect one or more network activities on a network;
  generate metadata associated with malware activity based on inspecting the one or more network activities;
  extract one or more threat events on the network from the metadata;
  detect one or more incidents based on a correlation between a first threat event of the one or more threat events, and a second threat event of the one or more threat events,
   the correlation being determined based on the metadata and a kill chain progression of the one or more threat events;
  generate a risk score for each incident of the one or more incidents based on the kill chain progression,
   the risk score being based on an asset value for a targeted device, and
   a first score, associated with a first stage of the kill chain progression, being lower than a second score associated with a second stage of the kill chain progression; and
  mitigate the one or more incidents based on the risk score,
   the mitigation including quarantining data associated with the one or more network activities.

13. The non-transitory computer-readable medium of claim 12, wherein, the one or more instructions, that cause the one or more processors to inspect the one or more network activities, cause the one or more processors to:
 inspect the one or more network activities using at least one of:
  a static analysis,
  a sandbox detonation, or
  machine learning.

14. The non-transitory computer-readable medium of claim 12, wherein the one or more instructions, that cause the one or more processors to inspect the one or more network activities, cause the one or more processors to:
 inspect one or more protocols.

15. The non-transitory computer-readable medium of claim 12, wherein the one or more instructions, that cause the one or more processors to inspect the one or more network activities, cause the one or more processors to:
 inspect one or more applications; and
 where the one or more instructions, that cause the one or more processors to generate the metadata, cause the one or more processors to:
  generate the metadata based on inspecting the one or more applications.

16. The non-transitory computer-readable medium of claim 12, wherein the one or more instructions, when executed by the one or more processors, further cause the one or more processors to:
 correlate the one or more threat events over a period of time.

17. A method, comprising:
 inspecting, by a device, one or more network activities on a network;

generating, by the device, metadata associated with malware activity based on inspecting the one or more network activities;

extracting, by the device, one or more threat events on the network from the metadata;

detecting, by the device, one or more incidents based on a correlation between a first threat event of the one or more threat events and a second threat event of the one or more threat events, the correlation being determined based on a kill chain progression of the one or more threat events; and generating, by the device, a risk score for each incident of the one or more incidents based on the kill chain progression, the risk score being based on an asset value of a targeted device; and mitigating, by the device, the one or more incidents based on the risk score, the mitigating including quarantining data associated with the one or more network activities.

18. The method of claim 17, wherein mitigating the one or more incidents comprises:

sending an alert to an administrator.

19. The method of claim 17, wherein mitigating the one or more incidents comprises:

flag the data associated with the one or more network activities.

20. The method of claim 17, wherein the risk score is determined in real time.

* * * * *